US006593716B1

United States Patent
Lange et al.

(10) Patent No.: US 6,593,716 B1
(45) Date of Patent: Jul. 15, 2003

(54) CIRCUIT USING CURRENT LIMITING TO REDUCE POWER CONSUMPTION OF ACTUATOR WITH DC BRUSH MOTOR

(75) Inventors: Christopher M. Lange, New Hope, MN (US); Greg T. Mrozek, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/717,564

(22) Filed: Nov. 21, 2000

(51) Int. Cl.[7] .............................................. H02P 3/18
(52) U.S. Cl. ...................... 318/471; 318/430; 318/434; 318/470
(58) Field of Search ................................. 318/470, 471, 318/430, 434

(56) References Cited

U.S. PATENT DOCUMENTS

| | | | |
|---|---|---|---|
| 3,931,557 A | | 1/1976 | Osburn |
| 4,414,498 A | * | 11/1983 | Gessner ....................... 318/685 |
| 4,423,362 A | * | 12/1983 | Konrad et al. .............. 318/139 |
| 4,623,826 A | | 11/1986 | Benjamin et al. |
| 4,633,152 A | * | 12/1986 | Farr .............................. 318/257 |
| 4,656,407 A | * | 4/1987 | Burney ......................... 123/352 |
| 4,746,850 A | | 5/1988 | Abbondanti |
| 4,969,756 A | * | 11/1990 | Villec et al. .............. 303/115.2 |
| 5,132,602 A | * | 7/1992 | Jorgensen et al. .......... 318/439 |
| 5,291,106 A | * | 3/1994 | Murty et al. ................. 318/370 |
| 5,409,194 A | | 4/1995 | Blanc et al. |
| 5,467,808 A | * | 11/1995 | Bell ...................... 160/168.1 P |
| 5,497,326 A | * | 3/1996 | Berland et al. ............. 318/468 |
| 5,514,947 A | * | 5/1996 | Berg ............................ 323/282 |
| 5,703,473 A | * | 12/1997 | Phillips et al. .............. 323/282 |
| 5,744,921 A | | 4/1998 | Makaran |
| 5,815,381 A | * | 9/1998 | Newlin ........................ 363/132 |
| 6,249,100 B1 | * | 6/2001 | Lange ......................... 318/430 |
| 6,348,752 B1 | * | 2/2002 | Erdman et al. ............. 310/194 |

OTHER PUBLICATIONS

"HVAC Product News", Jan. 27, 1997.

* cited by examiner

Primary Examiner—Rita Leykin (57) ABSTRACT

A drive circuit including a motor for positioning a damper from a rest position to a stalled position and protect the drive mechanism from damage due to increased current to the drive motor when the damper stalls by including a current limiter to prevent the current in the motor from exceeding a predetermined value.

20 Claims, 3 Drawing Sheets

FIG. 1

FIG. 2
NORMAL TEMPERATURE VERSION

CIRCUIT USING CURRENT LIMITING TO REDUCE POWER CONSUMPTION OF ACTUATOR WITH DC BRUSH MOTOR

DESCRIPTION OF APPLICATION

In a patent application of Christopher M. Lange entitled "Drive Circuit And Method For An Electric Actuator With Spring Return" Ser. No. 08/904,005, filed Jul. 31, 1997, issued Jun. 19, 2001 as U.S. Pat. No. 6,249,100B1 and assigned to the assignee of the present invention, an actuator system is shown in which an output shaft is positioned by a spring in a first position and upon command, is driven through a gear train to a second position by an electric motor. The circuit includes an input circuit for providing a current large enough to rotate the shaft against the force of the spring. A rotation sensor produces a signal when the motor and shaft are stalled at the second position and a modulation circuit receiving the signal from the rotation sensor operates to reduce the current to the motor so as to hold the stalled shaft and motor at the second position with a minimum of energy usage. In some applications, this circuit is intended for use in high ambient temperature conditions and accordingly, the rotation sensor utilizes a Hall effect device known to be able to withstand high temperatures. The use of a Hall effect device involves some undesirable features because it is undesirably complicated to implement and is slower than desired. The increased current to the motor at the stalled condition produces an increased torque that can over stress the gear train, at least temporarily, and gear damage may result.

BACKGROUND OF THE INVENTION

Field of the Invention

The present invention relates to an actuator system having an output shaft which is held in a first position by a spring and upon command an electric motor drives the shaft to a second position against the force of the spring and holds the shaft in the second position until a further command allows the spring to return the shaft to the first position.

BRIEF DESCRIPTION OF THE INVENTION

The present invention overcomes these problems by noting that the current in the motor increases sharply when the shaft reaches the stalled position. Thus, detecting the sharp rise in current becomes a simple way to detect the stalled condition, and does not involve waiting for a time period as great or greater than the normal period for one complete revolution to determine the condition, as may be required if only a rotation sensor is relied on. The problem of possible gear damage is overcome in the present invention, with the use of a current limiting circuit to prevent the current in the motor from increasing beyond a predetermined limit chosen so that the gear train will not be damaged. This satisfactorily protects the gear train in a high temperature embodiment of the present invention, which uses the Hall effect devices to sense rotation of the output. However, in a low or normal temperature embodiment of the present invention, the Hall effect devices are not needed but, in order to detect a stalled condition, with a current limiter in operation, the voltage to the motor is rapidly stopped and started so that the current repeatedly and rapidly oscillates just below the current limiting value. A counter is employed to count these oscillations and a predetermined number of such oscillations becomes an indication that the motor is stalled.

DETAILED DESCRIPTION OF THE PREFERRED EMBODIMENTS

Figure 1:
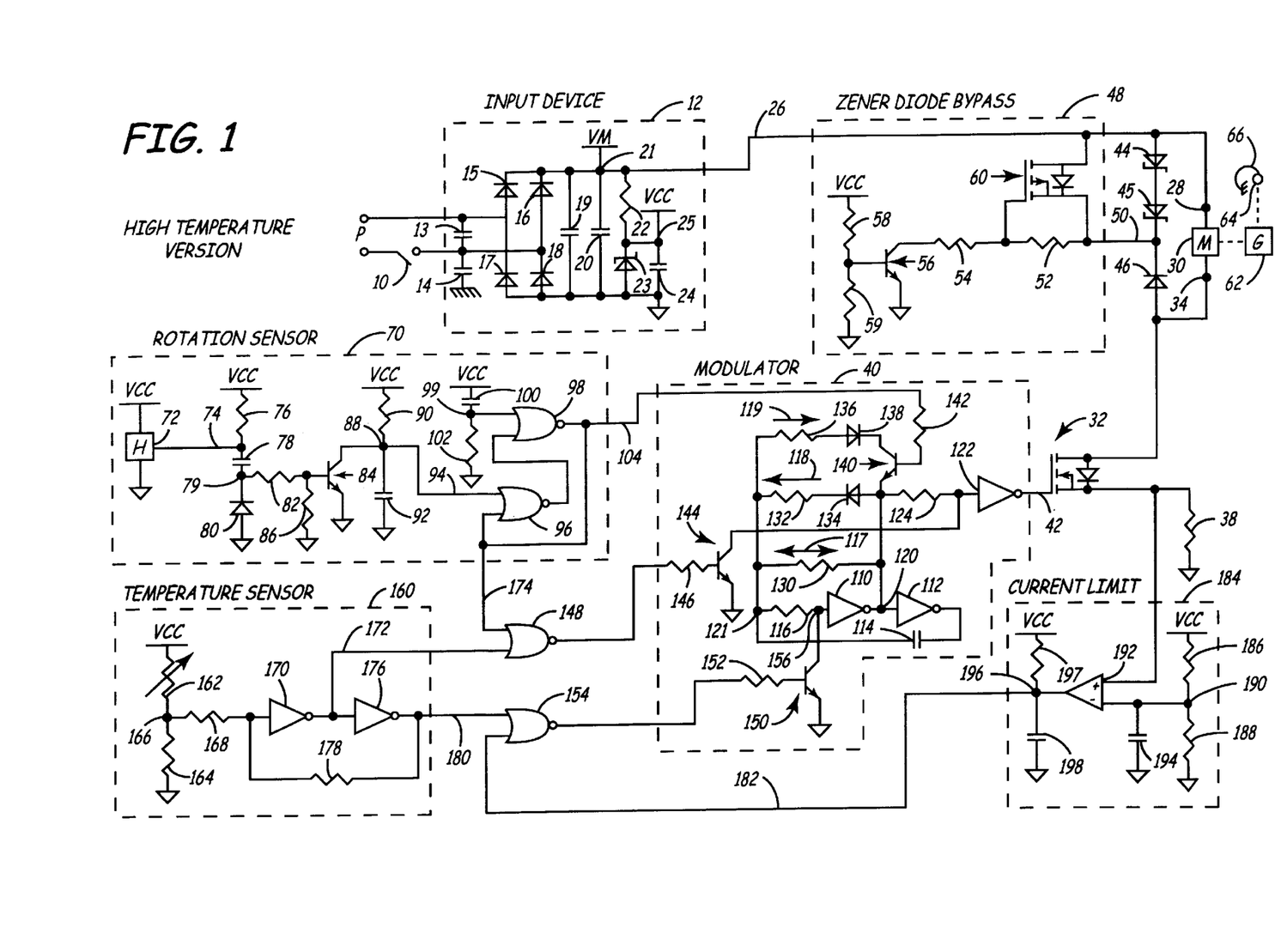
FIG. 1 is a block and schematic diagram of the high temperature embodiment of the present invention.

In FIG. 1, an input power source, P, which may be a 24 volt AC voltage, is shown connected through a switch, 10, to an Input Device, 12, that operates to produce an unregulated DC voltage, VM, and a regulated DC voltage, VCC. More particularly, the input power is applied across filter capacitors, 13 and 14, which are operable to filter noise to or from the power source, P, and to the intersections of two pairs of diodes, 15 and 16 and 17 and 18, connected in parallel to signal ground, and are operable to rectify the AC input. The rectified input is then applied across capacitors, 19 and 20, connected in parallel to signal ground, for further filtering to produce an un-regulated DC voltage, VM, at a junction point 21. This unregulated DC voltage, VM, may also be used elsewhere in the circuit, if needed, by way of connections (not shown). Junction point, 21, is also connected to a voltage regulator consisting of a resistor, 22, connected in series with a parallel connected Zener diode, 23, and capacitor 24, connected to signal ground, so as to produce a regulated DC voltage, VCC, at junction point, 25. The regulated DC voltage, VCC, may also be used elsewhere in the circuit, if needed, by way of connections (not shown).

The unregulated voltage, VM, at junction point, 21, is presented on a line, 26, to a first input terminal, 28, of a drive motor, 30. The current to motor, 30, is controlled by a load switch, 32, which may be an N-channel power FET, connected between a second input terminal, 34, of motor, 30, and signal ground through a resistor 38. Since the motor current passes through resistor, 38, when the load switch, 32, is in an "on" conducting state, the magnitude of the voltage across resistor, 38, is proportional to the motor current for purposes to be described below. Load switch, 32, receives its control signal from the output of a modulator, 40, on a line, 42. Motor, 30, is controlled to an "on" condition when the signal on line 42 is high (e.g., 5.1 volts) or a logical "1" and is controlled to an "off" condition when the signal on line, 42, is low (e.g., signal ground) or a logical "0" as will be explained below.

A pair of Zener diodes, 44 and 45, and a conventional diode, 46, are connected in series, cathode to cathode, across input terminals, 28 and 34, of motor, 30, to provide a current circulation path which limits the voltage induced across the windings of motor, 30, when the load switch, 32, switches to a non-conducting state. Also, during spring return, defined as the movement from the second position back to the first position, the Zener diodes, 44 and 45, help limit the speed of return. A circuit 48, labeled "Zener Diode Bypass", is shown connected by a line, 50, to the intersection between Zener diode, 45, and conventional diode, 46. Line, 50, is connected through a resistor, 52, and a resistor, 54, connected in series, to the collector of an NPN transistor, 56, the emitter of which is connected to signal ground. The base of transistor, 56, is connected to the junction between resistors a pair of resistors, 58 and 59, connected between the voltage source VCC and signal ground. Connected across Zener diodes, 44 and 45, is a FET, 60, having its gate electrode connected to the junction between resistors 52 and 54, its source electrode connected to line, 50, and its drain electrode connected to line, 26. As mentioned, the speed of the return of motor, 30, to its starting position is controlled by Zener diodes 44 and 45. However, when the system is operating to drive the motor, i.e., during powered operation, the flyback current would pass through the Zener diodes, 44 and 45, causing extra power dissipation. Accordingly, a bypass of the Zener diodes is desired during powered operation and the FET, 60, controlled by transistor, 56, provides a path for the current. A more complete explanation of the operation of the Zener diode by pass circuit, 48, may be obtained from our co-pending patent application entitled "Bypass Circuit for use in DC Brush Motor Control" filed Nov. 21, 2000, under Ser. No. 717,864, issued Apr. 9, 2002 as U.S. Pat. No. 6,369,540 and assigned to the assignee of the present invention.

Motor, 30, operates through a gear train, 62, to rotate a shaft, 64, against the bias of a spring, 66, to open, for example, a damper, (not shown). A rotation sensor circuit, 70, is shown, in this high temperature embodiment, including a Hall sensor device, 72, connected between the voltage source, VCC, and signal ground and produces an output on a line, 74. Hall sensor device, 72, may be like that of our above described application, Ser. No. 08/904,005, and is positioned to sense the rotation of motor, 30, and/or gear train, 62, and/or shaft, 64, to produce pulses on line, 74. A resistor, 76, is connected between line, 74, and VCC and acts as a pull up resistor. A capacitor 78 is connected between line 74 and a junction point 79 and through a diode 80 to signal ground. The pulses on line, 74, are effectively differentiated by capacitor, 78, to produce alternately positive and negative spikes at junction point, 79, but because the negative pulses should not be too large, diode, 80, operates to clamp the negative spikes to an acceptable level (e.g., –0.7 volts). This signal is presented from a junction point, 79, through a resistor, 82, to the base of an NPN transistor, 84, that are also connected through a resistor, 86, to signal ground. Transistor, 84, has its emitter electrode connected to signal ground and its collector electrode connected to a junction point, 88, between a resistor, 90, connected to VCC, and a capacitor, 92, connected to and signal ground. Junction point, 88, is also connected by a line, 94, to the upper input of a NOR gate, 96. The output of NOR gate, 96, is connected to the lower input of a NOR gate, 98. The upper input of NOR gate, 98, is connected to a junction point, 99, between a capacitor, 100 and a resistor 102 connected in series between VCC and signal ground. The output of NOR gate, 98, is connected to the lower input of NOR gate, 96. As will be further described, the combination of NOR gates, 96 and 98, constitute a Set/Reset latch with an output on a line, 104.

In operation, as motor, 30, rotates, the Hall sensor, 72, produces pulses on line, 74. The transitional edges of these pulses produce spikes at a junction point, 79 (the negative spikes being limited). These spikes operate to turn transistor, 84, "on" for a short period of time at regular intervals when the motor, 30, is rotating, causing capacitor, 92, to discharge to a signal ground potential whenever transistor, 84, is in an "on" conducting state. Under this condition, capacitor, 92, cannot fully charge and so will remain below a voltage which is operable to cause NOR gate, 96, to change states. The output line, 104, of the R-S latch consisting of NOR gates, 96 and 98, does not change states while the motor, 30 is running, and therefore stays in a logical low state which indicates that the stall position has not been reached. This continues until the pulses from Hall sensor, 72, stop (as would occur at the stalled position) and the transistor, 84, stops turning on at regular intervals and remains off allowing capacitor, 92, to charge up to a voltage which triggers NOR gate, 96, to the opposite state and the output of NOR gate, 98, on line, 104, becomes a logical high signal. This signal, indicative of a stalled condition, is presented by line, 104, to modulator, 40.

Modulator, 40, includes a pair of series connected inverters, 110 and 112, having a feedback path including a capacitor, 114, and a resistor, 116, connected from the output of inverter, 112, to the input of inverter, 110. Capacitor, 114, may be charged in a first polarity or opposite polarity through a selected combination of three current paths, shown as arrows, 117, 118 and 119. One or more of these current paths, 117, 118 and 119 is connected between a junction point, 120, between inverters, 110 and 112, and a junction point, 121, between capacitor, 114, and resistor, 116. An output inverter, 122, which supplies the control signal for switch 32, is connected through a resistor, 124, to junction point, 120. The current paths, 117, 118 and 119, though which capacitor, 114, is charged, are all connected between junctions, 121 and 120. A resistor, 130, forms the first current path, 117, a resistor, 132, in series with a diode, 134, oriented to permit current flow toward junction, 121, forms the second current path, and a resistor, 136, in series with a diode, 138, oriented to permit current flow away from junction point 121 and connected through an NPN transistor, 140, the emitter of which is connected to junction point, 120, forms the third current path, 119. Transistor, 140, receives its base control signal from the rotation sensor circuitry, 70 on line 104, through a resistor 142, as will be described hereinafter.

An NPN transistor, 144, has its emitter connected to signal ground, its base connected through a resistor, 146, to the output of a NOR gate, 148, and its collector terminal connected to the input of inverter, 122, for purposes to be explained below. Also an NPN transistor, 150, having its emitter electrode connected to signal ground, its base connected through a resistor, 152, to the output of a NOR gate, 154, and its collector connected to a junction point, 156, between resistor, 116, and the input of inverter, 110, for purposes to be explained below.

To describe the operation of the modulator, 40, assume an operating mode in which the input terminal of inverter, 110, has just switched to a logical low state of substantially signal ground potential. Also assume that transistor 150 is being maintained in a non-conducting "off" state by applying a logical low state of substantially ground potential to its base. Also assume that transistors, 140 and 144, are being maintained in a non-conductive "off" state by applying a logical low signal of substantially signal ground potential to their bases.

In such a configuration, as the output of inverter, 112, switches to its logical low state, junction point, 121, initially goes to a corresponding low voltage. Junction point, 120, is at high voltage corresponding to a logical high state at the output terminal of inverter, 110, and the input terminal of inverter, 112. Charging of capacitor, 114, then commences through resistors, 130 and 132, the diode, 134, in series with resistor, 132, being forward biased. The charging path containing resistor, 136, is not active because diode, 138, is reverse biased. Thus, capacitor 114 is charged with a first polarity. The time interval that inverters, 110 and 112, remain in their present state is determined by resistors, 130 and 132, and capacitor, 114.

Once capacitor, 114, is charged to a sufficient level, thereby raising the voltage at junction point, 121, and producing a logical high state at the input terminal of inverter, 110, inverters, 110 and 112, switch states, and the output of inverter, 112, switches to a logical high state. This produces a corresponding increase in the voltage at junction point, 121. Junction point, 120, is at a logical low state. Capacitor, 114, then commences to charge with a polarity opposite to the first polarity through resistor, 130, thereby decreasing the voltage at junction point, 121. The charging path, 118, is not active because diode, 134, is reverse biased and the charging path, 119, is not active because transistor, 140, is in a non-conducting off state. Once the voltage at junction point, 121, and the input terminal of inverter, 110, has decreased sufficiently, inverters, 110 and 112, again switch states, the output of inverter, 112, going to a logical low state.

In an exemplary actuator system embodiment, it was desired to operate motor, 30, in a drive mode under normal temperature conditions at an average voltage corresponding to an 80% duty cycle modulation level. This modulation duty cycle may be achieved by choosing the values of resistors, 130 and 132, such that capacitor, 114, charges more slowly through resistor, 130, than through the combination of resistors, 130 and 132, thus leaving the output of inverter, 122, at a logical high state for a longer interval each cycle than at a logical low state.

From the foregoing description, it can be seen that if transistor, 140, is maintained in a conductive state by a suitable base control signal, the current path, 119, will contribute when the voltage at junction, 121, is decreasing. This has the effect of decreasing the interval that the output of inverter, 122, is at a logical high state, thus lowering the duty cycle of the control signal applied to load switch, 32, and reducing the average voltage at which current is supplied to the motor, 30.

A temperature sensing circuit, 160, contains a voltage divider consisting of a temperature sensing resistor, 162, which may be an NTC thermistor in series with a fixed resistor, 164. The voltage at a junction point, 166, between resistors, 162 and 164, varies with temperature and is connected through a resistor, 168, to the input of an inverter, 170. The output of inverter, 170, is connected by a line, 172, to a first input of NOR gate, 148, the other input of which is connected by a line, 174, to the output, 104, of rotation sensing circuit, 70. The purpose of NOR gate, 148, will be described below. The output of inverter, 170, is also connected to the input of another inverter, 176, and a feedback resistor, 178, is connected from the output of inverter, 176, to the input of inverter, 170. The output of inverter, 176, is connected by a line, 180, to the upper input of NOR gate, 154, the other input of which is connected to an output line, 182, of a Current Limit circuit, 184. The purpose of NOR gate, 154, and the purpose of temperature sensing circuit, 160, will be explained below.

Current limiting circuit 184, which prevents the current in motor 30 from increasing above a predetermined safe value, contains a voltage divider consisting of resistors, 186 and 188, in series between VCC and signal ground. The voltage at a junction, 190, therebetween, is a predetermined value chosen in accordance with the current level to which current to motor, 30, should be limited. Junction point, 190, is connected to the positive input of a comparator, 192, and the negative terminal of comparator, 192, is connected to the resistor, 38, so as to receive the voltage indicative of the current to motor, 30. The positive input of comparator, 192, is connected across a capacitor, 194, to signal ground for the purpose of filtering noise at the positive input of comparator, 192. While motor, 30, is driving the shaft, 64, toward the stall position, the voltage at the negative terminal of comparator, 192, is less than the voltage at the positive terminal of comparator, 192, and the output of comparator, 192, will be a logical high or a "1". This output becomes logically low, or "0" whenever the voltage on the negative terminal of comparator, 192, becomes greater than the voltage on the positive terminal of comparator, 192, i.e., when the current to motor, 30, starts increasing at the stall position and the voltage at resistor, 38, begins to exceed the predetermined voltage set by resistors, 186 and 188. The output of comparator, 192, is connected to a junction point, 196, between a resistor, 197, and a capacitor, 198, connected in series between VCC and signal ground. Resistor, 197, and capacitor, 198, operate to introduce a predetermined delay to prevent switching on and off too rapidly. The output of Curent Limit circuit 184 at junction point, 196, is connected to the lower input of NOR gate, 154, by a connection, 182, as mentioned above. The operation of the current limiting circuit, 184, will be explained below.

Turning to overall operation of the entire drive circuit shown in FIG. 1, upon closure of switch, 10, to energize motor, 30, operating voltage, VCC, is supplied to the modulator circuit, 40, and the rotation sensor circuit, 70, from the Input Device, 12, via a connection (not shown). This step increase in voltage is supplied to a power-up circuit in Rotation Sensor, 70, comprising capacitor, 100, connected in series with a resistor, 102. The junction point, 99, between the capacitor, 100, and resistor, 102, is connected to the input terminal of NOR gate, 98. NOR gates, 98 and 96, are connected together to create an S-R latch, with junction point, 99, forming the RESET input terminal, junction point, 88, forming the SET input terminal, and line 104 forming the non-inverting output of the S-R latch. The step increase in voltage supplied to the power-up circuit is reflected through capacitor, 100, to the RESET junction point, 99, results in a logical low state on the non-inverting output line 104. In accordance with the foregoing description, this results in the oscillator operating at a first duty cycle of, for example, 80%.

As will be described hereinafter, once output shaft, 64, has stalled, rotation sensor circuit, 70, forces the non-inverting output line, 104, to a logical high state. Until shaft has stalled, the output of the S-R latch on line; 104, is in a logical low state, thereby maintaining transistor, 140, in modulator, 40, in a non-conducting off state. When the output on line, 104, switches to a logical high state, a suitable base control signal will be applied to transistor, 140, decreasing the operating duty cycle of the oscillator to, for example, 20%, which corresponds to the desired holding mode energization for motor 30.

Modulator, 40, can also force the load switch, 32, to be maintained in a conducting on state (100% duty cycle) when needed. Transistor, 144, provides a means to maintain the load switch, 32, in a conducting on state separate from the rest of the oscillator. When transistor, 144, is maintained in a conductive state by a suitable base control signal supplied from the output of NOR gate, 148, through resistor, 146, the input of inverter 122 is forced to a logical low state. This causes load switch, 32, to be in a conducting on state and motor, 30, to be "on" regardless of the signal at junction point, 120. When transistor, 144, is in a non-conducting state, the output of inverter, 122, is the inverse of the signal at junction point, 120. Resistor, 124, is used to isolate the input of inverter 122 from the rest of the oscillator.

It should be noted that this capability of supplying a 100% duty cycle to the load switch, 32, is used to provide the motor with 100% duty cycle under high temperature driving conditions, i.e., with gear train, 62, rotating. NOR gate, 148, combines the signals from the rotation circuit on output line, 174, and the temperature sensing circuit on line, 172. The effective logic at the output of this NOR gate, 148, is: IF gear train, 62, is rotating AND the temperature sensor produces a logical high signal on line, 172, indicative of high temperature, THEN apply the 100% duty cycle to motor, 30.

Modulator, 40, can also force the load switch, 32, to be maintained in a non-conducting "off" state when needed. Transistor, 150, provides a means to effectively shut down the oscillator. When the oscillator is shut down, the load switch, 32, is also "off" as long as transistor, 144, is maintained in a non-conducting "off" state. When transistor, 150, is maintained in conductive "on" state by a suitable base control signal applied from the output of NOR gate, 154, through resistor, 152, the input of inverter, 110, is forced to a logical low state, forcing the output of inverter, 110, to a logical high state. The oscillator is able to remain in this state because the input of inverter, 110, is isolated from the rest of the oscillator by resistor, 116. If transistor, 144, is in a non-conducting "off" state, the input of inverter, 122, is also at a logical high state, forcing the output of inverter, 122, to a logical low level and the load switch, 32, to be maintained in an non-conducting "off" state.

This capability of forcing the load switch into a non-conducting "off" state is used to shut off motor, 30, under normal temperature conditions when the current limit, as determined by the current limiter, 184, has been exceeded. NOR gate, 154, combines the signals from temperature sensing circuit, 160, on line 180 and the signal from the current limiting circuit, 184, on line 182. The effective logic at the output of NOR gate, 154, is: IF the device is at normal temperature, as determined by the temperature sensing circuit on line, 180, AND the current limit has been exceeded as determined by the signal from the current limiting circuit, 184, on line, 182, THEN turn off motor, 30.

Figure 2:
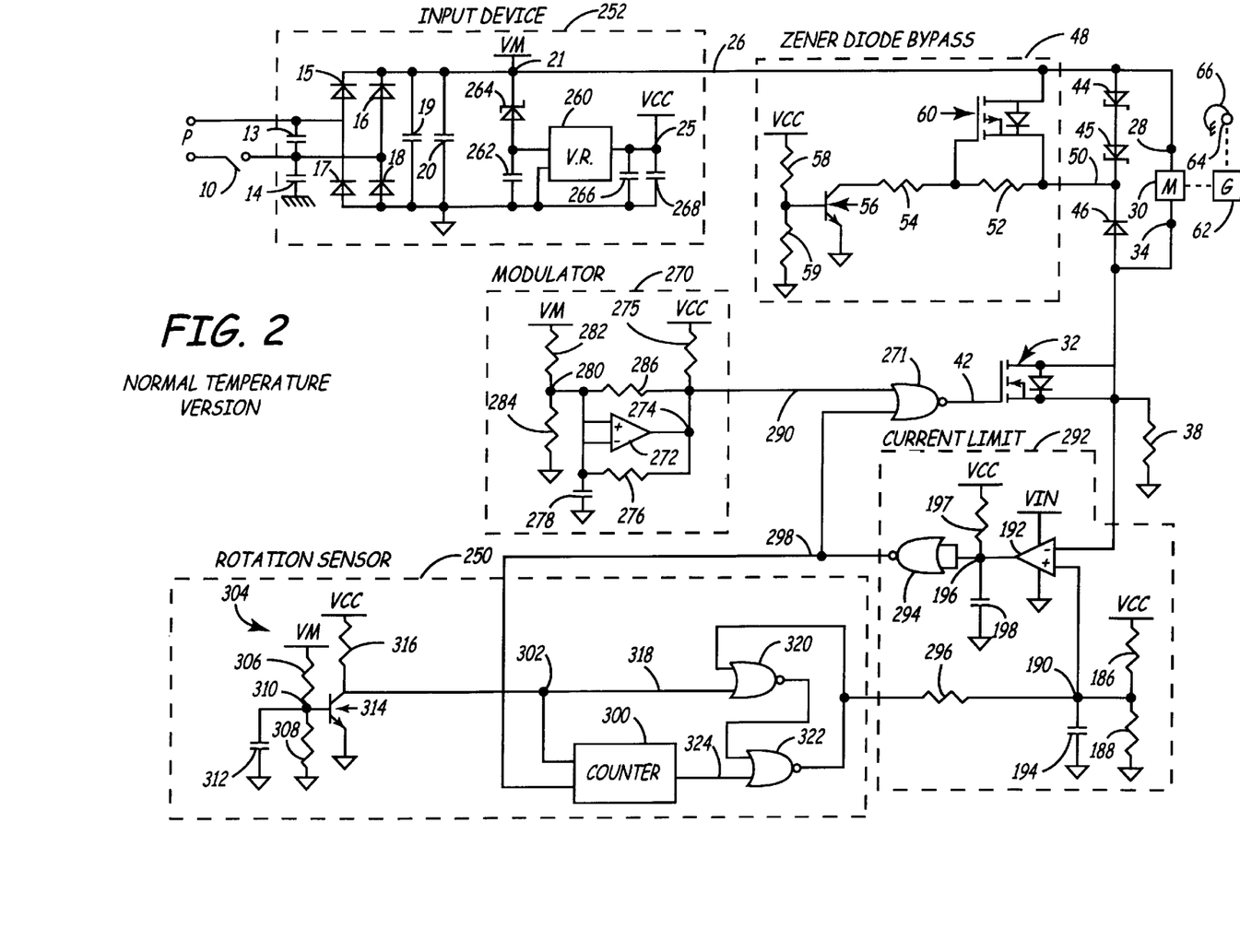
FIG. 2 is a block and schematic diagram of the low or normal temperature embodiment of the present invention; and, FIG. 3 is a graph showing the variation of the current in the motor with time during various portions of the operation.

As mentioned above, the use of Hall effect devices, 72, in FIG. 1, is only necessary to determine when the shaft, 64, has stalled when high temperatures are encountered but this method of sensing a stalled condition is slow and undesirably complicated to implement as explained above. By using the sharp increase of current, when the motor, 30, stalls, a much faster and less complex way of determining a stalled condition can be accomplished. FIG. 2 shows the circuit of FIG. 1 modified for use at lower temperatures and it is seen that the rotation sensor, 70, including the Hall effect device, 72, have been eliminated and a different method of detecting rotation, 250, is included, as will be explained below.

In FIG. 2, circuits and components, which are the same as those described in connection with FIG. 1, have been identified with the same reference numerals. In FIG. 2, as in FIG. 1, an input power source, P, which may be a 24 volt AC voltage, is shown connected through a switch, 10, to an input device, 252, that is slightly different than the input device 12 of FIG. 1, but still operates to produce an unregulated DC voltage, VM, of magnitude that varies with the magnitude of the input from source P, and a regulated DC source, VCC. More particularly, as in FIG. 1, the input power is applied across filter capacitors, 13 and 14, connected to chassis ground and to four diodes, 15, 16, 17 and 18, to rectify the AC input. The rectified input is then applied across capacitors, 19 and 20, connected in parallel for further filtering. The voltage across capacitors, 19 and 20, is the unregulated DC voltage derived from the power source P and is identified as VM. A voltage regulator box 260, containing a standard voltage regulator circuit operable to produce a DC voltage of predetermined magnitude, is shown having an input connected across a capacitor, 262, that is connected in series with a Zener diode, 264, both of which are connected in parallel with capacitors, 19 and 20, between VM and signal ground. Zener diode, 264, operates to limit the voltage to the input of voltage regulator, 160. The output of voltage regulator, 260, is filtered by capacitors, 266 and 268, to produce the regulated DC voltage, VCC, at a junction point 25. As before, voltages VM and VCC may be used throughout the circuit to supply these voltages to various circuits and components by connections (not shown)

As was the case in FIG. 1, the voltage, VM, is presented on a line, 26, to a first input terminal, 28, of a drive motor, 30. The current to motor, 30, is controlled by load switch, 32, which, again, may be an N-channel power FET, connected between a second input terminal, 34, of motor, 30, and signal ground through resistor, 38. Since the current to motor, 30, passes through resistor, 38, when the load switch is conducting, the magnitude of the voltage across resistor, 38, is proportional to such current for purposes to be described below. Load switch, 32, receives its control signal from the output of a modulator, 270, through a NOR gate, 271, on a line, 42. Motor, 30, is controlled to an "on" condition when the signal on line, 42, is positive or a logical "1" and is controlled to an "off" condition when the signal on line 42 is at signal ground or a logical "0" as will be explained below.

Also, as was the case in FIG. 1, a pair of Zener diodes, 44 and 45, and a conventional diode, 46, are connected in series, across input terminals, 28 and 34, of motor, 30, to provide a current circulation path which limits the voltage induced across the windings of motor, 30, when the load switch, 32, is in a non-conducting state. Also, during spring return, the Zener diodes, 44 and 45, help limit the speed of return. The Zener Diode Bypass circuit 48 is identical to FIG. 1 and its description and operation will not be further described here. Again, it should be noted that this circuit is described and claimed in our, above mentioned, co-pending patent application entitled "Bypass Circuit for use in DC Brush Motor Control."

Modulator, 270, is a unique modulator that produces a square wave output with a duty cycle that varies with the voltage, VM. Because VM is unregulated, its variations could produce significant changes in voltage to motor 30, so to minimize this, the output of modulator, 270, which is inverted through NOR gate, 271, is caused to produce a greater duty cycle to the motor, 30, when VM is low and a lesser duty cycle when VM is high. This produces an voltage to motor, 30, that has an average that is relatively constant. Modulator, 270, contains a comparator, 272, having an output connected to a junction, 274, that is connected to a pull-up resistor, 275, and a feedback resistor, 276, connected to the negative input of comparator, 272. The negative input of comparator, 272, is also connected through a capacitor, 278, to signal ground. The positive input of comparator, 272, is connected to a junction point, 280, between a resistor, 282, and a resistor, 284, connected in series between the voltage source, VM, and signal ground. Junction point, 280, is connected through a resistor, 286, to junction point, 274. Junction point, 274, is also connected by a line, 290, to the upper input of NOR gate, 271, the lower input of which is connected to receive the output of a current limiting circuit, 292.

In operation, when the positive input of comparator, 272, is greater than the negative input of comparator, 272, the output transistor of comparator, 272, is turned off. In this case, resistor, 275, which is smaller than resistors, 276 and 286, will tend to bias the output of comparator, 272, toward the voltage, VCC. Thus, the output at junction point, 274, is at a logic high level close to the level of VCC. When the positive input of comparator, 272, is less than the negative input of comparator, 272, the output transistor of comparator, 272, is turned on, thus pulling the output voltage at junction point, 274, to substantially zero volts. For purposes of the following description, it will be assumed that the output of comparator, 272, is exactly zero volts when the voltage at the positive input of comparator, 272, is less than the voltage at the negative input of comparator, 272, and, the output of comparator, 272, is exactly VCC when the voltage at the positive input of comparator, 272, is greater than the voltage at the negative input of comparator, 272. The value of resistor, 275, may be ignored for practical purposes.

For an ideal 50% duty cycle, based on a fixed value VM=VCC, the components may have the following values:

Resistor 282=10 Kohm
Resistor 284=10 Kohm
Resistor 286=10 Kohm
Resistor 276=20 Kohm
Capacitor 278=0.01 uF It will be noted that the voltage at the positive input of comparator, 272, is determined by the network consisting of resistor, 282, resistor, 284, and resistor, 286. This voltage depends on whether the output is low or high. If the output is low, the voltage at the positive input of comparator, 272, is at $\frac{1}{3}$ of VCC (1.667 volts) and if the output is high, the voltage at the positive input of comparator, 272, is at $\frac{2}{3}$ of VCC (3.33 volts). This results in a 50% duty cycle square wave at the junction point 274. Capacitor 278, charges up through resistor 276 when the output of comparator 272, is high. When the charge on capacitor, 278, reaches $\frac{2}{3}$ of VCC, the output of comparator, 272, switches to a low value and capacitor, 278, discharges through resistor, 276. When the charge on capacitor reaches $\frac{1}{3}$ of VCC, the output of comparator, 272, switches back to a high level. The time it takes for capacitor, 278, to charge to $\frac{2}{3}$ VCC is the same as the time for capacitor, 278, to discharge to $\frac{1}{3}$ VCC and this repeats indefinitely causing a 50% duty cycle square wave at junction point, 274.

For a 63% duty cycle, the components may have the following values:

Resistor 282=5 Kohm
Resistor 284=10 Kohm
Resistor 286=10 Kohm
Resistor 276=20 Kohm
Capacitor 278=0.01 uF Here, if the output is low, the voltage at the positive input of comparator, 272, is at $\frac{1}{2}$ of VCC (2.5 volts) and if the output is high, the voltage at the positive input of comparator, 272, is at $\frac{3}{4}$ of VCC (3.75 volts) and it takes more time for the capacitor, 278, to charge to the $\frac{3}{4}$ VCC value than it does to discharge to the $\frac{1}{2}$ VCC value.

For a 37% duty cycle, the components may have the following values:

Resistor 282=10 Kohm
Resistor 284=5 Kohm
Resistor 286=10 Kohm
Resistor 276=20 Kohm
Capacitor 278=0.01 uF Here, if the output is low, the voltage at the positive input of comparator, 272, is at $\frac{1}{4}$ of VCC (1.25 volts) and if the output is high, the voltage at the positive input of comparator, 272, is at $\frac{1}{2}$ of VCC (2.5 volts) and it takes less time for the capacitor, 278, to charge to the $\frac{1}{2}$ VCC value as it does to discharge to the $\frac{1}{4}$ VCC value.

It is seen that the oscillation range of capacitor 278 can be varied by changing the values of resistors 282, 284 and 286 and that this directly affects the duty cycle. The frequency of oscillation depends on the magnitude of the range that capacitor, 278, oscillates over and the value of the time constant created by resistor, 276, and capacitor, 278.

The above values are based on the assumption that VM is a fixed value equal to VCC. In actual practice, the voltage VM can have considerable variation, for example, between about 26 volts DC and about 42 volts DC. Accordingly, the values for resistor 282, 284, and 286 are actually chosen to effect a best elimination of variation of VM's effects on motor speed. In the preferred embodiment, resistor 282 was chosen to be 35.7 Kohm, resistor 284 was chosen to be 2940 ohms and resistor 286 was chosen to be 49.9 Kohms. The effective voltage that the motor, 30, sees is VM multiplied by the duty cycle of the control signal operating switch 32. Since the speed of a DC motor is dependent on the effective voltage supplied to it, the variation of VM can cause large variation in the speed at which the motor, 30, drives. However, in the present invention, instead of connecting resistor, 282, to the regulated voltage, VCC, as would be the case in a normal oscillator, resistor 282 is connected to the unregulated voltage VM. By doing this, variations of VM, which would cause a change of speed for motor, 30, also cause changes to the positive input of comparator, 272. When VM increases, the range over which the capacitor, 278, oscillates is effectively dragged up and thus increases the duty cycle at the output of the comparator, 272. When VM decreases, the range over which the capacitor, 278, oscillates is effectively dragged down and thus decreases the duty cycle at the output of comparator, 272. As will be explained, this output is inverted before it controls switch, 32, and thus the duty cycle seen by the motor, 30, is decreased as the voltage VM is increased and vice versa. The variation in speed of motor, 30, is therefore, minimized. In the present invention, by properly choosing the values for resistors, 282, 284 and 286, the variation in voltage to motor, 30, over the entire range of variation of VM (about 26 volts to about 42 volts) was kept to about 1 volt (i.e., from a minimum of about 15.5 volts to a maximum of about 16.5 volts).

Current limiting circuit, 292, is almost identical to the current limiting circuit, 184, of FIG. 1. The only differences are that the output of comparator, 192, at junction point, 196, is connected to both of the inputs of a NOR gate, 294, for the purpose of inverting the output of the comparator, 192, and the predetermined voltage at junction point, 190, is connected through a resistor, 296, to the Rotation Detector, 250, for purposes to be explained hereinafter. As was the case with respect to FIG. 1, comparator, 192, compares the voltage across resistor, 38, which varies with the current to motor, 30, with the predetermined voltage from the voltage divider comprising resistors, 186 and 188. As long as the motor, 30, is driving shaft, 64, towards the stall position in a normal fashion, the voltage on the positive terminal of comparator, 192, is less than the predetermined voltage on the negative terminal of comparator, 192, and the output of comparator, 192, will be positive or a logical "1" signal. Whenever the current to motor, 30, increases sharply, as is the case at the stall point, the voltage at the negative input of comparator, 192, exceeds the predetermined voltage at the positive terminal of comparator, 192, and changes the output of comparator, 192, to a negative or logical "0". The resistor, 197, and capacitor, 198, delay this signal from immediately returning to a logical "1" and present it to the input of the NOR gate, 294. Since both of the inputs of NOR gate, 294, are connected to junction point, 196, NOR gate, 294, acts as in inverter and the output thereof is the opposite of the input. Accordingly, during the normal driving of motor, 30, the signal at the output of NOR gate, 294, will be low or a logical "0" signal which will change to a high or logical "1" signal at the stall condition. The output of NOR gate, 294, is connected to a junction point, 298, that is connected to the lower input of NOR gate, 271. Thus, during normal driving by motor, 30, NOR gate, 271, will turn "on" and "off" with the signal on line, 290, and thus pass the inverted output of modulator, 270, through to the control switch, 32. When a stall condition is reached, and the signal at junction point, 298, switches from a low or logical "0" to a high or logical "1", the output of NOR gate, 271, is shut off and motor, 30, stops until the inputs to NOR gate,.294, returns to a logic high level after a time delay determined by resistor, 197 and capacitor, 198. Thus the signal at junction point, 298, will alternate between a low or logical "0" and a high or logical "1" until the system is shut off by opening switch, 10.

Junction point, 298, is also connected to an input of Rotation Detector circuit, 250, that replaces the Rotation Sensor circuit, 70, of FIG. 1 since the Hall effect devices are not needed for the normal or low temperature operation. As explained above, the signal at junction point, 298, will be a constant low or logical "0" during normal driving of motor, 30, and at the stall condition this signal will begin alternating between a logical "0" and a logical "1". Junction point, 298, is connected to a first input of a counter, 300, which may be a standard counter. The RESET input of counter, 300, is connected to a junction point, 302, the signal on which is controlled by a reset circuit, 304, consisting of a resistor, 306, and a resistor, 308, connected in series between the source of voltage, VM, and signal ground. The junction point, 310, therebetween is connected through a capacitor, 312, to signal ground and to the base of a NPN transistor, 314, whose collector is connected to signal ground. The emitter of transistor, 314, is connected through a resistor, 316, to the regulated voltage, VCC, and to the junction point, 302, at the second input of counter, 300. Thus, each time the system is turned on by switch, 10, the counter, 300, and the R-S latch formed by NOR gates, 320 and 322, are reset. Junction point, 302, is also connected by a line, 318, to the lower terminal of a NOR gate, 320, having an output connected to the upper terminal of a NOR gate, 322, whose lower terminal is connected to receive the output of counter, 300, over a line, 324. The output of NOR gate, 322, is connected to the upper input of NOR gate, 320, and to the resistor, 296, in the current limiting circuit, 292. The combination of NOR gates, 320 and 322, forms an R-S Latch. It is seen that as long as motor, 30, is driving shaft, 64, in a normal manner toward a stall position, the output of counter, 300, does not change but stays at a logical low and the R-S latch formed by NOR gates, 320 and 322, produces a logical high signal to resistor, 296. This signal, being high adds to the signal produced at the intersection of resistors, 186 and 188, in the Current Limiting circuit, 292, and comparator, 192, continues to operate around a first, higher level. However, at a stall condition, counter 300 begins counting and when it reaches a predetermined count, produces a logic high signal on line, 324, causing the output of the R-S latch to switch to a logic low level. This signal lowers the voltage at junction point, 190, and thereafter the system will turn "on" and "off" at a lower voltage than was the case before the stall condition. Thus, motor 30 will turn "on" and "off" at this lower current level.

Figure 3:
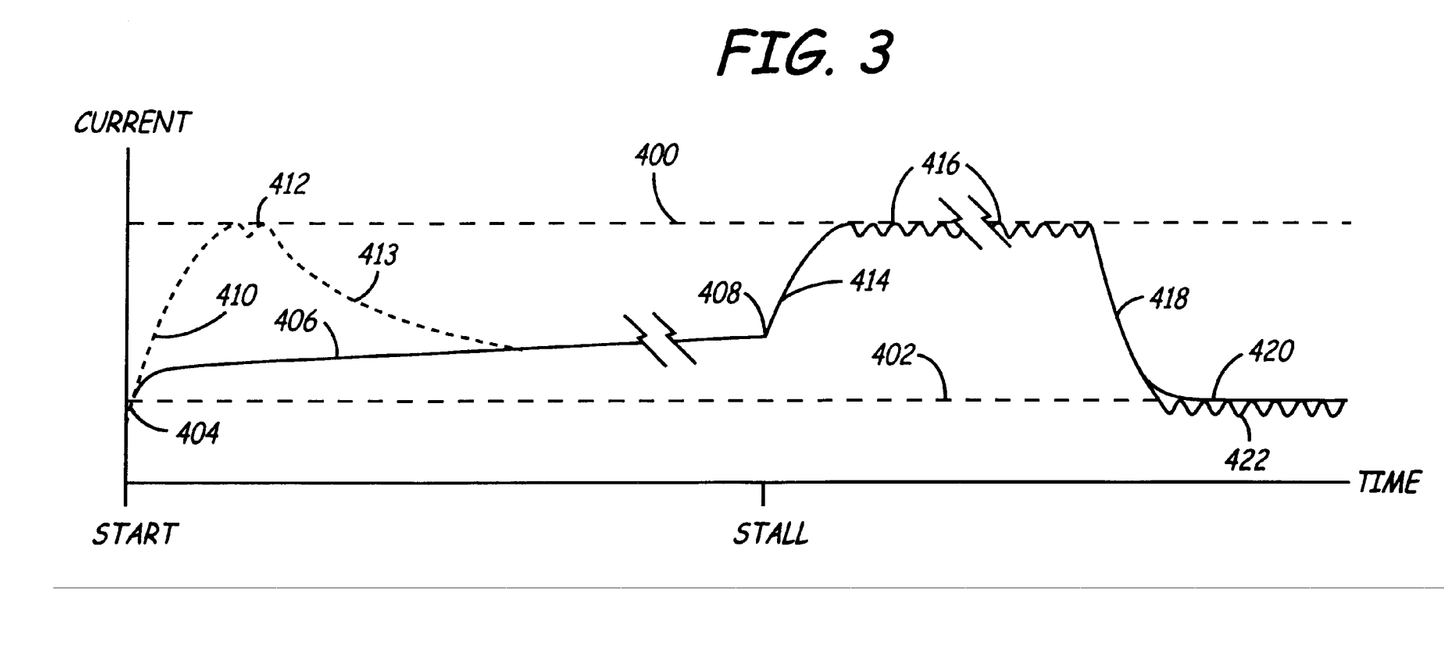

FIG. 3 is a graph showing the change in current to motor, 30, at various conditions of operation of the circuits discussed above. In FIG. 3, the limiting current desired in Motor, 30, to prevent damage to the gears, 62, is shown by dashed line, 400, and the current used to keep the motor with enough torque to prevent the shaft, 64, from returning to its first or rest position under the influence of spring, 66, is shown by dashed line, 402. The current in motor, 30, is shown by solid line, 404, and upon starting with the closure of switch, 10, in FIG. 1, this increases along a portion of curve, 404, shown by reference numeral, 406, until the stall condition is reached at point, 408. While motor, 30, is driving shaft, 64, the current is not likely to reach the limit 400 but in some unusual conditions it might and, if it did, the voltage across resistor, 38, of FIG. 1 would increase, for example as shown by dashed line, 410, until it reached the limit, 400. At limit, 400, the current would be alternately shut "off" and "on" by the action of the current limiter, 184, as shown by the portion of curve, 410, identified by reference numeral, 412. This "on" and "off" oscillation about limit, 400, would continue until either the Rotation Sensor, 70, of FIG. 1 or the Rotation Detector, 250, of FIG. 2 produced a signal indicating that a stall condition had been reached and the current to the motor, 30, would then drop to the current level 402. On the other hand, if the unusual condition disappeared, then the current would fall from the "on" and "off" oscillation at 410 along a curve such as 413 until it reached the normal curve 406 at which time it would continue to increase slightly, due to increased load produced by the spring, 66, until the stall position 408 was reached. At this time the current would rapidly increase as shown by portion, 414, of curve, 404, until it again reached the limit value, 400, and begin alternately stopping and starting as shown by portion, 416, of curve, 404. This would continue until the Rotation Sensor, 70, of FIG. 1, or the Rotation Detector, 250, of FIG. 2, determined that the shaft, 64, really has reached the stall position at which time a signal on line, 104, would cause Modulation Circuit, 40, in the case of FIG. 1 to reduce the driving current to motor, 30, toward the "hold" value, 402, and the current would fall as shown by portion, 418, of curve, 404, until the "hold" value, 402, was reached as shown by solid line 420. In the high temperature embodiment of FIG. 1, the current would then follow curve, 420, until the switch, 10, is turned off. In the low, or normal temperature embodiment of FIG. 2, the alternate stopping and starting of motor, 30, would continue as shown by portion 422 of curve 404 until switch 10 was turned off. This occurs, in FIG. 2, because of the change of voltage to the positive input of comparator, 192, when the stall position is reached.

It is seen that we have produced a current control circuit that operates to drive an output shaft to a desired position and then stop while holding the stopped position at a lower current for efficiency and for reducing power consumption. We have also provided a built in protection for the gears driving the shaft and we have provided a novel alternate way of detecting the stall condition. It will be understood, that the NOR gates, the inverters and the comparators are powered usually by connections to VCC or VM although, to simplify the drawings, these connections have not been shown. Furthermore, many changes to the circuits shown in describing the preferred embodiments will occur to those having ordinary skill in the art. For example, the modulation circuit may take various forms, the rotation sensor may use alternates to the Hall effect devices and other voltage regulators, counters, and logic devices may be employed. We therefore do not wish to be limited to the specific apparatus used in connection with describing the preferred embodiments.

What is claimed is:

1. Positioning apparatus for driving a movable member from a first position to a second positions where it stalls, the movable member having a bias urging the movable member to the first position and an electric drive member including a rotatable member to drive the movable member through a connection against the force of the bias to the second position, the drive member exerting a force proportional to the electric current supplied to the drive member and wherein the current increases when the movable member stalls so as to produce an undesirable excessive force, comprising:
   a drive circuit having an output connected to the drive member and operable to supply current to the drive member normally below a first level when the movable member is driven from the first position to the second position; and,
   a current limiter connected to the drive circuit to detect the current supplied to the drive member, said current limiter capable of detecting an increased current above the first level, during a period less than one rotation of said rotatable member, to reduce the current level supplied to the drive member to a level no greater than the first level.

2. Apparatus according to claim 1, wherein the bias is a spring, and the drive member is an electric brush motor.

3. Apparatus according to claim 1, further including a motion sensor operable to detect when the movable member stalls to produce a signal which changes the current supplied to the drive member to a second level below the first level and sufficient to hold the movable member in the second position against the bias.

4. Apparatus according to claim 3, wherein the motion sensor includes a Hall effect device.

5. Apparatus according to claim 3, wherein the motion sensor includes a counter to produce a count each time the current supplied to the drive member reaches the first level so as to reduce the current to the second level when the count reaches a predetermined number.

6. The method of determining that a movable member, driven by an electric drive member in which a drive force produced by the drive member varies with the current therein, has reached a stalled position comprising the steps of:
   A. monitoring the magnitude of the current in the drive member;
   B. reducing the current to the drive member below the predetermined value when the monitored current reaches a predetermined value;
   C. counting the number of times the monitored current reaches the predetermined value; and
   D. producing a signal indicative of the movable member having reached the stalled position when the times counted reaches a certain number.

7. The method of claim 6, further including the step of:
   E. biasing the movable member away from the stalled position.

8. The method of claim 7, wherein step B comprises:
   F. reducing the current in the drive member to a second predetermined value when the certain number is reached.

9. The method of claim 8, wherein the member is biased away from the stalled position and, the second predetermined level is at least sufficient to overcome the bias.

10. Apparatus for use in positioning a movable member between a first position and a stalled second position, comprising:
    a bias device connected to the movable member to bias the movable member toward the first position;
    an electric brush motor;
    a drive connected between the motor and the member to allow the motor to drive the member from the first position to the second position against the bias of the bias device;
    a source of energizing current;
    a switch connected in circuit with the source and the motor and operable to energize and de-energize the motor, the current to the motor having a magnitude below a first limit whenever the motor drives the movable member to the second position and a magnitude greater than the first limit when the movable member reaches the second position;
    a current limiter operable to sense the current in the motor and operable, whenever the value becomes greater than the first limit, to operate the switch to return the magnitude to a value no greater than the first limit; and
    a motion sensor operable to sense the movable member having reached the second position and to thereafter reduce the current from the source to a second value at least sufficient to hold the movable member in the second position.

11. Apparatus according to claim 10, wherein the source of energizing current includes a modulator and the switch includes a FET having a gate electrode.

12. Apparatus according to claim 11, further including a logic device connected between the modulator and the gate electrode, the logic device operable by a signal from the modulator to supply a logical "1" signal to the FET so as to energize the motor and a logical "0" signal to de-energize the motor respectfully.

13. Apparatus according to claim 12, wherein the modulator is controlled to produce current at the second level when the motion sensor indicates that the second position has been reached.

14. Apparatus according to claim 10, wherein the motion sensor includes a pulse counter positioned to detect when the motor is not driving.

15. Apparatus according to claim 10, wherein the motion sensor includes a counter connected to the current limiter to count the number of times the current reaches the first limit as an indication that the second position has been reached.

16. Apparatus according to claim 15, wherein the current to the motor is reduced to the second value upon the count reaching a predetermined value.

17. Apparatus according to claim 16, wherein the switch includes a FET.

18. Apparatus according to claim 17, further including a logic device connected to the gate electrode of the FET, the logic device operable to supply logic "1" and "0" signals to the gate of the FET so as to energize and de-energize the motor respectfully.

19. A modulator having a square wave output; and a source of voltage which may have variable magnitude connected to the modulator so that the duty cycle of the square wave output changes inversely with the magnitude of the voltage to produce a duty cycle that is larger for smaller voltages and smaller for larger voltages to minimize the variation of the product of duty cycle and voltage, wherein the modulator includes a comparator having a positive input connected to the source of voltage, a negative input connected through a capacitor to a reference voltage, an output connected to a regulated voltage and to the negative input of the comparator; and
    an inverter connected to the output of the comparator to produce an inverted output of the modulator.

20. Apparatus according to claim 19 wherein the modulator is included in a circuit for use with a motor driven from the source of voltage and including a switch connected to the motor to turn the motor on and off in accordance with an input signal; and means connecting the modulator to the source of voltage so that when the duty cycle of the square wave output changes inversely with the magnitude of the voltage the speed variations in the motor are minimized, wherein the modulator includes a comparator having a positive input connected to the source of voltage, a negative input connected through a capacitor to a reference voltage, and an output connected to a regulated voltage and to the negative input of the comparator; and an inverter connected to the output of the comparator to produce an inverted output of the modulator.

* * * * *